(12) United States Patent
Hamakubo et al.

(10) Patent No.: US 11,579,358 B2
(45) Date of Patent: Feb. 14, 2023

(54) OPTICAL FIBER

(71) Applicant: SUMITOMO ELECTRIC INDUSTRIES, LTD., Osaka (JP)

(72) Inventors: Katsushi Hamakubo, Osaka (JP); Chiaki Tokuda, Osaka (JP); Noriaki Iwaguchi, Osaka (JP); Tatsuya Konishi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/277,793

(22) PCT Filed: Jun. 10, 2020

(86) PCT No.: PCT/JP2020/022903
§ 371 (c)(1),
(2) Date: Mar. 19, 2021

(87) PCT Pub. No.: WO2020/255835
PCT Pub. Date: Dec. 24, 2020

(65) Prior Publication Data
US 2021/0349255 A1    Nov. 11, 2021

(30) Foreign Application Priority Data

Jun. 19, 2019    (JP) .............................. JP2019-114005

(51) Int. Cl.
*G02B 6/02*       (2006.01)
*C03C 25/105*     (2018.01)
*C03C 25/1065*    (2018.01)

(52) U.S. Cl.
CPC ........ *G02B 6/02395* (2013.01); *C03C 25/105* (2013.01); *C03C 25/109* (2013.01)

(58) Field of Classification Search
CPC .................................................. G02B 6/02395
See application file for complete search history.

(56) References Cited

U.S. PATENT DOCUMENTS 4,344,669 A     8/1982  Uchida et al.
9,925,560 B2 *  3/2018  Armstrong ............... C08J 7/046
(Continued)

FOREIGN PATENT DOCUMENTS

CN    100551860 C    10/2009
EP    0 114 092 A1   7/1984
(Continued)

OTHER PUBLICATIONS

Farid Khelifa et al., Effect of photo-crosslinking on the performance of silica nanoparticle-filled epoxidized acrylic copolymer coatings, J. Mater. Chem. A, 2013, 1, 10334 (Year: 2013).*
(Continued)

*Primary Examiner* — Peter Radkowski
(74) *Attorney, Agent, or Firm* — Faegre Drinker Biddle & Reath LLP

(57) ABSTRACT

An optical fiber comprises a glass fiber comprising a core and a cladding, and a coating resin layer, wherein the coating resin layer has a primary resin layer being in contact with the glass fiber and coating the glass fiber, and a secondary resin layer coating the primary resin layer, and the primary resin layer and the secondary resin layer are resin layers containing inorganic oxide particles.

6 Claims, 1 Drawing Sheet

(56) References Cited

U.S. PATENT DOCUMENTS

| | | |
|---|---|---|
| 2012/0321265 A1 | 12/2012 | Terruzzi et al. |
| 2014/0301704 A1* | 10/2014 | Tanaka ............... G02B 6/02395 385/128 |
| 2016/0121365 A1* | 5/2016 | Armstrong ........... C09D 5/1693 428/317.9 |
| 2016/0306109 A1 | 10/2016 | Iwaguchi et al. |
| 2017/0242187 A1 | 8/2017 | Iwaguchi et al. |
| 2018/0128970 A1 | 5/2018 | Homma et al. |
| 2020/0262749 A1 | 8/2020 | Hamakubo |

FOREIGN PATENT DOCUMENTS

| | | | |
|---|---|---|---|
| GB | 2 026 716 A | | 2/1980 |
| JP | H06183790 A | * | 7/1994 |
| JP | H08-217495 A | | 8/1996 |
| JP | 2000007717 A | * | 1/2000 |
| JP | 2009-514994 A | | 4/2009 |
| JP | 2010-511770 A | | 4/2010 |
| JP | 2014-219550 A | | 11/2014 |
| JP | 2015-089865 A | | 5/2015 |
| JP | 2018-077303 A | | 5/2018 |
| WO | WO-2004/080907 A1 | | 9/2004 |
| WO | WO-2007/050308 A1 | | 5/2007 |
| WO | WO-2008/069656 A1 | | 6/2008 |
| WO | WO-2011/063838 A1 | | 6/2011 |
| WO | WO-2017/065274 A1 | | 4/2017 |
| WO | WO-2020/071544 A1 | | 4/2020 |

OTHER PUBLICATIONS

J. Shiue, Effects of silica nanoparticle addition to the secondary coating of dual-coated optical fibers, Acta Materialia 54 (2006) 2631-2636 (Year: 2006).*

Shiue, J. et al., "Effects of silica nanoparticle addition to the secondary coating of dual-coated optical fibers," Acta Materialia, Mar. 30, 2006, vol. 54, pp. 2631-2636.

* cited by examiner

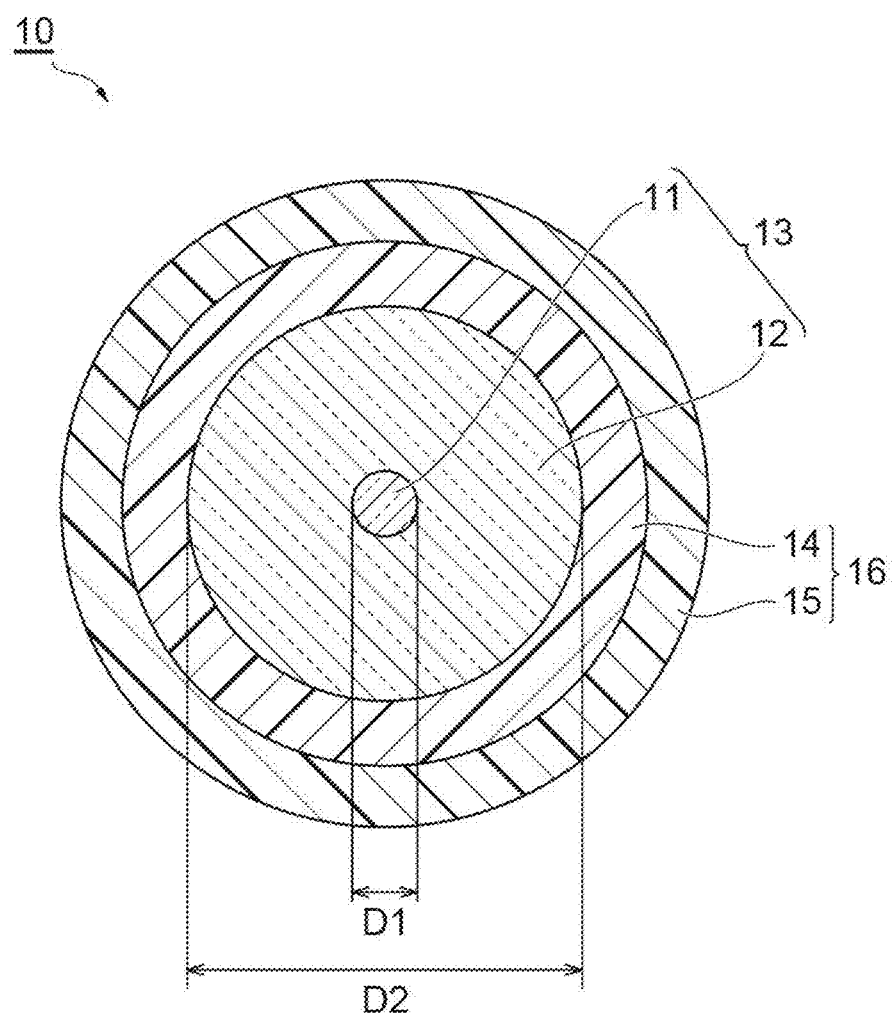

OPTICAL FIBER

TECHNICAL FIELD

The present disclosure relates to an optical fiber.

This application claims priority based on Japanese Patent Application No. 2019-114005 filed on Jun. 19, 2019, and incorporates all the contents described in the Japanese application.

BACKGROUND ART

An optical fiber has generally a coating resin layer for protecting a glass fiber that is an optical transmission medium. The optical fiber has been required to have excellent lateral pressure characteristics in order to reduce an increase in transmission loss induced by micro-bend generated when lateral pressure is applied to the optical fiber.

The coating resin layer can be formed by using an ultraviolet curable resin composition containing an oligomer, a monomer, a photopolymerization initiator and the like. For example, in Patent Literature 1, the improvement of the lateral pressure characteristics of the optical fiber is investigated by forming a resin layer using an ultraviolet curable resin composition containing a filler made of synthetic silica.

CITATION LIST

Patent Literature

[Patent Literature 1] JP 2014-219550 A

SUMMARY OF INVENTION

An optical fiber according to an aspect of the present disclosure comprises a glass fiber comprising a core and a cladding, and a coating resin layer, wherein the coating resin layer has a primary resin layer being in contact with the glass fiber and coating the glass fiber, and a secondary resin layer coating the primary resin layer, and the primary resin layer and the secondary resin layer are resin layers containing inorganic oxide particles.

BRIEF DESCRIPTION OF DRAWING

FIG. 1 is a schematic cross-section diagram showing an example of the optical fiber according to the present embodiment.

DESCRIPTION OF EMBODIMENTS

Problem to be Solved by the Present Disclosure

A coating resin layer generally comprises a primary resin layer and a secondary resin layer. It is conceivable that the difference in the linear expansion coefficients between a resin composition constituting a primary resin layer and a resin composition constituting a secondary resin layer is significant as one of the factors for the generation of voids in an optical fiber. When the Young's modulus of the secondary resin layer is increased in order to improve the lateral pressure characteristics of the optical fiber, the Young's modulus of the primary resin layer is low, easily generating voids during the heat cycle test. When voids occur, the transmission loss of the optical fiber at low temperature tends to increase.

An object of the present disclosure is to provide an optical fiber having excellent lateral pressure characteristics and a small increase in transmission loss at a low temperature.

Effect of the Present Disclosure

The present disclosure can provide an optical fiber having excellent lateral pressure characteristics and a small increase in transmission loss at a low temperature.

DESCRIPTION OF EMBODIMENTS OF THE PRESENT DISCLOSURE

First, the contents of the embodiment of the present disclosure will be described by listing them. An optical fiber according to an aspect of the present disclosure comprises a glass fiber comprising a core and a cladding, and a coating resin layer, wherein the coating resin layer has a primary resin layer being in contact with the glass fiber and coating the glass fiber, and a secondary resin layer coating the primary resin layer, and the primary resin layer and the secondary resin layer are resin layers containing inorganic oxide particles.

The primary resin layer and the secondary resin layer comprise inorganic oxide particles, thereby allowing improvement in the lateral pressure characteristics of the optical fiber and reduction of the increase in transmission loss at a low temperature after the heat cycle test.

Due to easy adjustment of Young's modulus of the coating resin layer, the inorganic oxide particles may be at least one selected from the group consisting of silicon dioxide, zirconium dioxide, aluminum oxide, magnesium oxide, titanium oxide, tin oxide, and zinc oxide.

Due to excellent dispersion properties in the resin layer and easy suppression of the generation of voids, the inorganic oxide particles are silicon dioxide, and the amount of silicon atoms contained in the coating resin layer may be 3% by mass or more and 22% by mass or less.

Due to reduction of the increase in transmission loss at a low temperature, the Young's modulus of the primary resin layer may be 0.03 MPa or more and 0.7 MPa or less at 23° C.

Due to further improvement of the lateral pressure characteristics of the optical fiber, the Young's modulus of the secondary resin layer may be 1300 MPa or more and 2750 MPa or less at 23° C.

DETAIL OF EMBODIMENT OF THE PRESENT DISCLOSURE

Specific examples of a resin composition and an optical fiber according to the embodiments of the present disclosure will be described referring to the drawing as necessary. The present invention is not limited to these illustrations but is indicated by the claims and intended to include meanings equivalent to the claims and all modifications within the claims. In the following description, the same reference numerals are given to the same elements in the description of the drawing, and redundant explanations are omitted.

<Optical Fiber>

FIG. 1 is a schematic cross-section diagram showing an example of the optical fiber according to the present embodiment. The optical fiber 10 comprises the glass fiber 13 including the core 11 and the cladding 12, and the coating resin layer 16 including the primary resin layer 14 provided on the outer periphery of the glass fiber 13 and the secondary resin layer 15.

The cladding 12 surrounds the core 11. The core 11 and the cladding 12 mainly include glass such as silica glass, germanium-added silica glass or pure silica glass can be used, for example, in the core 11, and pure silica glass or fluorine-added silica glass can be used in the cladding 12.

In FIG. 1, for example, the outside diameter (D2) of the glass fiber 13 is about 100 μm to 125 μm, and the diameter (D1) of the core 11 constituting the glass fiber 13 is about 7 μm to 15 μm. The thickness of the coating resin layer 16 is typically about 22 μm to 70 μm. The thickness of each of the primary resin layer 14 and the secondary resin layer 15 may be about 5 μm to 50 μm.

When the outside diameter (D2) of the glass fiber 13 is about 125 μm and the thickness of the coating resin layer 16 is 60 μm or more and 70 μm or less, the thickness of each of the primary resin layer 14 and the secondary resin layer 15 may be about 10 μm to 50 μm, and for example, the thickness of the primary resin layer 14 may be 35 μm and the thickness of the secondary resin layer 15 may be 25 μm. The outside diameter of the optical fiber 10 may be about 245 μm to 265 μm.

When the outside diameter (D2) of the glass fiber 13 is about 125 μm and the thickness of the coating resin layer 16 is 27 μm or more and 48 μm or less, the thickness of each of the primary resin layer 14 and the secondary resin layer 15 may be about 10 μm to 38 μm, and for example, the thickness of the primary resin layer 14 may be 25 μm and the thickness of the secondary resin layer 15 may be 10 μm. The outside diameter of the optical fiber 10 may be about 179 μm to 221 μm.

When the outside diameter (D2) of the glass fiber 13 is about 100 μm and the thickness of the coating resin layer 16 is 22 μm or more and 37 μm or less, the thickness of each of the primary resin layer 14 and the secondary resin layer 15 may be about 5 μm to 32 μm, and for example, the thickness of the primary resin layer 14 may be 25 μm and the thickness of the secondary resin layer 15 may be 10 μm. The outside diameter of the optical fiber 10 may be about 144 μm to 174 μm.

(Secondary Resin Layer)

From the viewpoint of reducing the linear expansion coefficient of the secondary resin layer and improving the lateral pressure characteristics and low temperature characteristics of the optical fiber, the secondary resin layer 15 contains inorganic oxide particles. The secondary resin layer 15 can be formed by curing a resin composition comprising a base resin containing an oligomer comprising urethane (meth)acrylate, a monomer, and a photopolymerization initiator, and hydrophobic inorganic oxide particles. That is, the secondary resin layer 15 may include a cured product of a resin composition comprising a base resin containing an oligomer comprising urethane (meth)acrylate, a monomer, and a photopolymerization initiator and hydrophobic inorganic oxide particles.

The inorganic oxide particles according to the present embodiment have a surface subjected to hydrophobic treatment. The hydrophobic treatment according to the present embodiment is introduction of a hydrophobic group onto the surface of the inorganic oxide particles. The inorganic oxide particles having a hydrophobic group introduced have excellent dispersibility in the resin composition. The hydrophobic group may be a reactive group such as a (meth)acryloyl group or a vinyl group, or a non-reactive group such as an aliphatic hydrocarbon group (for example, an alkyl group) or an aromatic hydrocarbon group (for example, a phenyl group). In the case of the inorganic oxide particles having a reactive group, the resin layer having high Young's modulus is easy to form.

The inorganic oxide particles according to the present embodiment are dispersed in a dispersion medium. Using the inorganic oxide particles dispersed in the dispersion medium allows for uniform dispersion of the inorganic oxide particles in the resin composition and then improvement of the storage stability of the resin composition. The dispersion medium is not particularly limited as long as curing of the resin composition is not obstructed. The dispersion medium may be reactive or non-reactive.

A monomer such as a (meth)acryloyl compound and an epoxy compound can be used as the reactive dispersion medium. Examples of the (meth)acryloyl compound include 1,6-hexanediol di(meth)acrylate, EO-modified bisphenol A di(meth)acrylate, polyethylene glycol di(meth)acrylate, PO-modified bisphenol A di(meth)acrylate, polypropylene glycol di(meth)acrylate, and polytetramethylene glycol di(meth)acrylate. Compounds exemplified by monomers described above may be used as the (meth)acryloyl compound.

A ketone solvent such as methyl ethyl ketone (MEK), an alcohol solvent such as methanol (MeOH), or an ester solvent such as propylene glycol monomethyl ether acetate (PGMEA) may be used as a non-reactive dispersion medium. In the case of the non-reactive dispersion medium, the resin composition may be prepared by mixing the base resin and the inorganic oxide particles dispersed in the dispersion medium and removing a part of the dispersion medium.

The inorganic oxide particles dispersed in the dispersion medium remain to be dispersed in the resin layer after curing of the resin composition. When a reactive dispersion medium is used, the inorganic oxide particles are mixed with the dispersion medium in the resin composition and are incorporated in the resin layer with the dispersion condition maintained. When a non-reactive dispersion medium is used, at least a part of the dispersion medium evaporates and disappears from the resin composition, but the inorganic oxide particles remain in the resin composition with the dispersion condition remained and are also present in the cured resin layer with the dispersion condition remained. Electron microscope observation shows that the inorganic oxide particles present in the resin layer are in the condition of dispersion of the primary particle.

Due to excellent dispersion properties in the resin layer and easy formation of a tough resin layer, it is preferable that the inorganic oxide particles are at least one selected from the group consisting of silicon dioxide (silica), zirconium dioxide (zirconia), aluminum oxide (alumina), magnesium oxide (magnesia), titanium oxide (titania), tin oxide, and zinc oxide. From the viewpoint of excellent inexpensiveness, easy surface treatment, permeability to ultraviolet ray, easy provision of a resin layer with appropriate hardness, and the like, it is more preferable that the hydrophobic silica particles be used as the inorganic oxide particles according to the present embodiment.

From the viewpoint of increasing the Young's modulus of the resin layer, the average primary particle size of the inorganic oxide particles is preferably 5 nm or more and 800 nm, more preferably 10 nm or more and 700 nm or less, and further preferably 10 nm or more and 650 nm or less. The average primary particle diameter can be measured with image analysis of electron microscope pictures, a light scattering method or a BET method, for example. The dispersion medium in which the primary particle of the inorganic oxide is dispersed appears to be visually transparent when the diameter of the primary particle is small. When the diameter of the primary particle diameter is relatively large (40 nm or more), the dispersion medium in which the primary particle is dispersed appears to be clouded, but the precipitate is not observed.

The content of the inorganic oxide particles is preferably 1% by mass or more and 65% by mass or less, more preferably 10% by mass or more and 60% by mass or less, and further preferably 15% by mass or more and 60% by mass or less based on the total amount of the resin composition. The content of the inorganic oxide particles of 1% by mass or more allows easy formation of the resin layer with excellent lateral pressure characteristics. The content of the inorganic oxide particles of 65% by mass or less allows easy improvement in the application properties of the resin composition.

The average primary particle size of the inorganic oxide particles contained in the secondary resin layer may be 5 nm or more and 200 nm, 8 nm or more and 100 nm or less, 9 nm or more and 50 nm or less, or 10 nm or more and 30 nm or less. The content of the inorganic oxide particles contained in the secondary resin layer may be 1% by mass or more and 65% by mass or less, 10% by mass or more and 60% by mass or less, or 15% by mass or more and 60% by mass or less based on the total amount of the secondary resin layer.

As urethane (meth)acrylate, an oligomer obtained by reacting a polyol compound, a polyisocyanate compound, and a hydroxyl group-containing (meth)acrylate compound can be used.

Examples of the polyol compound include polytetramethylene glycol, polypropylene glycol and bisphenol A-ethylene oxide addition diol. The number average molecular weight of the polyol compound may be 400 or more and 4000 or less, 400 or more and 2000 or less, or 400 or more and 1000 or less. Examples of the polyisocyanate compound includes 2,4-tolylene diisocyanate, 2,6-tolylene diisocyanate, isophorone diisocyanate, and dicyclohexylmethane 4,4'-diisocyanate. Examples of the hydroxyl group-containing (meth)acrylate compound include 2-hydroxyethyl (meth)acrylate, 2-hydroxybutyl (meth)acrylate, 1,6-hexanediol mono(meth)acrylate, pentaerythritol tri(meth)acrylate, 2-hydroxypropyl (meth)acrylate, and tripropylene glycol mono(meth)acrylate.

As a catalyst for synthesizing urethane (meth)acrylate, an organotin compound is generally used. Examples of the organotin compound include dibutyltin dilaurate, dibutyltin diacetate, dibutyltin maleate, dibutyltin bis(2-ethylhexyl mercaptoacetate), dibutyltin bis(isooctyl mercaptoacetate), and dibutyltin oxide. From the viewpoint of easy availability or catalyst performance, it is preferable that dibutyltin dilaurate or dibutyltin diacetate be used as catalyst.

When urethane (meth)acrylate is synthesized, lower alcohols having 5 or less carbon atoms may be used. Examples of the lower alcohols include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, and 2,2-dimethyl-1-propanol.

The oligomer may further include epoxy (meth)acrylate. The oligomer obtained by reacting a compound having a (meth)acryloyl group with an epoxy resin having two or more glycidyl groups can be used as an epoxy (meth)acrylate.

At least one selected from the group consisting of the monofunctional monomer having one polymerizable group and the multifunctional monomer having two or more polymerizable groups can be used as the monomer. A monomer may be used by mixing two or more monomers.

Examples of the monofunctional monomer include (meth)acrylate monomers such as methyl (meth)acrylate, ethyl (meth)acrylate, propyl (meth)acrylate, n-butyl (meth)acrylate, sec-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth)acrylate, lauryl (meth)acrylate, 2-phenoxyethyl (meth)acrylate, 3-phenoxybenzyl acrylate, phenoxydiethylene glycol acrylate, phenoxypolyethylene glycol acrylate, 4-tert-butylcyclohexanol acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenol polyethylene glycol (meth)acrylate, nonylphenoxypolyethylene glycol (meth)acrylate, and isobornyl (meth)acrylate; carboxyl group containing monomers such as (meth)acrylic acid, (meth)acrylic acid dimer, carboxyethyl (meth)acrylate, carboxypentyl (meth)acrylate, and ω-carboxy-polycaprolactone (meth)acrylate; heterocycle containing monomers such as N-(meth)acryloyl morpholine, N-vinyl pyrrolidone, N-vinyl caprolactam, N-acryloylpiperidine, N-methacryloylpiperidine, N-(meth)acryloylpyrrolidine, 3-(3-pyridine) propyl (meth)acrylate, and cyclic trimethylolpropane formal acrylate; maleimide monomers such as maleimide, N-cyclohexyl maleimide, and N-phenyl maleimide; amide monomers such as (meth)acrylamide, N, N-dimethyl (meth)acrylamide, N, N-diethyl (meth)acrylamide, N-hexyl (meth)acrylamide, N-methyl (meth)acrylamide, N-butyl (meth)acrylamide, N-butyl (meth)acrylamide, N-methylol (meth)acrylamide, and N-methylolpropane (meth)acrylamide; aminoalkyl (meth)acrylate monomers such as aminoethyl (meth)acrylate, aminopropyl (meth)acrylate, N, N-dimethylaminoethyl (meth)acrylate, and tert-butylaminoethyl (meth)acrylate; and succinimide monomers such as N-(meth)acryloyloxymethylene succinimide, N-(meth)acryloyl-6-oxyhexamethylene succinimide, and N-(meth)acryloyl-8-oxyoctamethylene succinimide.

Examples of the multifunctional monomer include: monomers having two polymerizable groups such as ethylene glycol di(meth)acrylate, polyethylene glycol di(meth)acrylate, polypropylene glycol di(meth)acrylate, neopentyl glycol di(meth)acrylate, tripropylene glycol di(meth)acrylate, di(meth)acrylate of alkylene oxide adduct of bisphenol A, tetraethylene glycol di(meth)acrylate, hydroxypivalic acid neopentyl glycol di(meth)acrylate, 1,4-butanediol di(meth)acrylate, 1,6-hexanediol di(meth)acrylate, 1,9-nonanediol di(meth)acrylate, 1,12-dodecanediol di(meth)acrylate, 1,14-tetradecanediol di(meth)acrylate, 1,16-hexadecanediol di(meth)acrylate, 1,20-eicosanediol di(meth)acrylate, isopentyldiol di(meth)acrylate, 3-ethyl-1,8-octanediol di(meth)acrylate, and EO adduct of bisphenol A di(meth)acrylate; and monomers having three or more polymerizable groups such as trimethylolpropane tri(meth)acrylate, trimethyloloctane tri(meth)acrylate, trimethylolpropane polyethoxy tri(meth)acrylate, trimethylolpropane polypropoxy tri(meth)acrylate, trimethylolpropane polyethoxy polypropoxy tri(meth)acrylate, tris[(meth)acryloyloxyethyl] isocyanurate, pentaerythritol tri(meth)acrylate, pentaerythritol polyethoxy tetra(meth)acrylate, pentaerythritol polypropoxy tetra(meth)acrylate, pentaerythritol tetra (meth)acrylate, ditrimethylolpropane tetra(meth)acrylate, dipentaerythritol tetra(meth)acrylate, dipentaerythritol penta (meth)acrylate, dipentaerythritol hexa(meth)acrylate, and caprolactone-modified tris[(meth)acryloyloxyethyl] isocyanurate.

From the viewpoint of increasing the Young's modulus of the resin layer, the monomer preferably includes a multifunctional monomer, and more preferably includes a monomer having two polymerizable groups.

The photopolymerization initiator can be appropriately selected from known radical photopolymerization initiators and used. Examples of the photopolymerization initiator include 1-hydroxycyclohexyl phenyl ketone (Omnirad 184, manufactured by IGM Resins), 2,2-dimethoxy-2-phenylacetophenone, 1-(4-isopropylphenyl)-2-hydroxy-2-methylpropan-1-one, bis(2,6-dimethoxybenzoyl)-2,4,4-trimethylpentylphosphine oxide, 2-methyl-1-[4-(methylthio)phenyl]-2-morpholino-propan-1-one (Omnirad 907 manufactured by IGM Resins), 2,4,6-trimethylbenzoyldiphenylphosphine oxide (Omnirad TPO manufactured by IGM Resins), and bis(2,4,6-trimethylbenzoyl) phenylphosphine oxide (Omnirad 819, manufactured by IGM Resins).

The resin composition may further contain a silane coupling agent, a leveling agent, an antifoaming agent, an antioxidant, or a sensitizer.

The silane coupling agent is not particularly limited as long as it does not disturb curing of the resin composition. Examples of the silane coupling agent include tetramethyl silicate, tetraethyl silicate, mercaptopropyl trimethoxysilane, vinyltrichlorosilane, vinyltriethoxysilane, vinyltris(β-methoxy-ethoxy)silane, β-(3,4-epoxycyclohexyl)-ethyltrimethoxysilane, dimethoxydimethylsilane, diethoxydimethylsilane, 3-acryloxypropyltrimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis-[3-(triethoxysilyl)propyl]tetrasulfide, bis-[3-(triethoxysilyl)propyl]disulfide, γ-trimethoxysilylpropyldimethylthiocarbamyl tetrasulfide, and γ-trimethoxysilylpropyl benzothiazyl tetrasulfide.

The Young's modulus of the secondary resin layer is preferably 1300 MPa or more and 2750 MPa or less at 23° C., more preferably 1400 MPa or more and 2700 MPa or less, and further preferably 1500 MPa or more and 2700 MPa or less. The Young's modulus of the secondary resin layer of 1300 MPa or more is easy to improve the lateral pressure characteristics, and the Young's modulus of 2750 MPa or less can provide proper toughness to the secondary resin layer, and thus can be easy to improve low temperature characteristics.

(Primary Resin Layer)

From the viewpoint of reducing the linear expansion coefficient of the primary resin layer and improving the lateral pressure characteristics and low temperature characteristics of the optical fiber, the primary resin layer 14 contains inorganic oxide particles. The primary resin layer 14 can be formed by curing a resin composition comprising a base resin containing an oligomer comprising urethane (meth)acrylate, a monomer, a photopolymerization initiator, and a silane coupling agent, and inorganic oxide particles. A urethane (meth)acrylate, a monomer, a photopolymerization initiator, a silane coupling agent, and inorganic oxide particles may be appropriately selected from compounds exemplified in the secondary resin layer. The resin composition constituting the primary resin layer has composition different from the base resin forming the secondary resin layer.

The content of the inorganic oxide particles is preferably 1% by mass or more and 45% by mass or less, more preferably 2% by mass or more and 40% by mass or less, and further preferably 3% by mass or more and 30% by mass or less based on the total amount of the resin composition. The content of the inorganic oxide particles of 1% by mass or more allows easy formation of a tough resin layer. The content of the inorganic oxide particles of 45% by mass or less allows formation of a resin layer with a low Young's modulus.

The average primary particle size of the inorganic oxide particles contained in the primary resin layer may be 5 nm or more and 200 nm, 10 nm or more and 100 nm or less, 15 nm or more and 80 nm or less, or 20 nm or more and 70 nm or less. The content of inorganic oxide particles contained in the primary resin layer may be 1% by mass or more and 45% by mass or less, 2% by mass or more and 40% by mass or less, or 3% by mass or more and 30% by mass or less based on the total amount of the primary resin layer.

From the viewpoint of suppressing the generation of voids in the optical fiber, the Young's modulus of the primary resin layer is preferably 0.03 MPa or more and 0.7 MPa or less at 23° C.±2° C., more preferably 0.04 MPa or more and 0.65 MPa or less, and further preferably 0.05 MPa or more and 0.6 MPa or less.

Due to excellent dispersion properties in the resin layer and easy suppression of the generation of voids, the inorganic oxide particles contained in the primary resin layer and the secondary resin layer are preferably hydrophobic silica particles. The amount of silicon atoms (Si) contained in the coating resin layer is preferably 3% by mass or more and 22% by mass or less, more preferably 4% by mass or more and 20% by mass or less, and further preferably 4% by mass or more and 19% by mass or less based on the total amount of coating resin layer. The amount of Si of 3% by mass or more allows easy improvement in the lateral pressure characteristics of the optical fiber. The amount of Si of 22% by mass or less allows easy improvement in the low temperature characteristics of the optical fiber. The amount of Si can be measured with ICP-AES.

EXAMPLES

Hereinafter, the results of evaluation test using Examples and Comparative Examples according to the present disclosure will be shown, and the present disclosure is described in more detail. The present invention is not limited to these examples.

[Resin Composition for a Primary Resin Layer]

(Oligomer)

Urethane acrylates a1, a2, and a3 obtained by reacting polypropylene glycol having a molecular weight of 4000, isophorone diisocyanate, hydroxyethyl acrylate, and methanol were prepared as the oligomers. For urethane acrylates a1, a2, and a3, the ratio of an oligomer having acryloyl groups at both ends and an oligomer having an acryloyl group at one end was adjusted by changing the blending ratio of hydroxyethyl acrylate and methanol.

(Inorganic Oxide Particles)

Hydrophobic silica particles dispersed in MEK, having a methacryloyl group, and with an average primary particle size of 20 to 60 nm were prepared as the inorganic oxide particles.

(Resin Composition)

75 parts by mass of urethane acrylates a1, a2, or a3, 12 parts by mass of nonylphenoxy polyethylene glycol acrylate, 6 parts by mass of N-vinylcaprolactam, 2 parts by mass of 1,6-hexanediol diacrylate, 1 part by mass of 2,4,6-trimethylbenzoyldiphenylphosphine oxide, and 1 part by mass of 3-mercaptopropyltrimethoxysilane were mixed to prepare a base resin. Next, the base resin and the silica particles were mixed, and then most of MEK as a dispersion medium was removed under reduced pressure to produce a resin composition for the primary resin layer.

[Resin Composition for a Secondary Resin Layer]
(Oligomer)

As the oligomer, urethane acrylate (UA) obtained by reacting a polypropylene glycol having a molecular weight of 600, 2,4-tolylene diisocyanate, and hydroxyethyl acrylate, and epoxy acrylate (EA) were prepared.

(Inorganic Oxide Particles)

Silica sol comprising hydrophobic silica particles dispersed in MEK, having a methacryloyl group, and with an average primary particle size of 10 to 20 nm was prepared as the inorganic oxide particles.

(Resin Composition)

20 parts by mass of UA, 20 parts by mass of EA, 25 parts by mass of isobornyl acrylate, 20 parts by mass of 2-phenoxyethyl acrylate, 15 parts by mass of tripropylene glycol diacrylate, 0.5 parts by mass of 1-hydroxycyclohexyl phenyl ketone, and 0.5 parts by mass of 2,4,6-trimethylbenzoyldiphenylphosphine oxide were mixed to prepare a base resin. Next, the base resin and the silica sol were mixed, and then most of MEK as a dispersion medium was removed under reduced pressure to produce a resin composition for the secondary resin layer.

In Table 1 and Table 2, the numerical value of the silica particles is the content based on the total amount of the resin composition. The total amount of the resin composition and the total amount of the cured product of the resin composition may be considered to be the same.

[Production of an Optical Fiber]

On the outer periphery of a 125 μm diameter glass fiber composed of a core and cladding, a primary resin layer with a thickness of 35 μm was formed by using a resin composition for the primary resin layer, and a secondary resin layer with a thickness of 25 μm was further formed on the outer periphery thereof by using a resin composition for the secondary resin layer to produce optical fibers. A linear speed was 1500 m/min.

(Young's Modulus of the Primary Resin Layer)

The Young's modulus of the primary resin layer was measured by the Pullout Modulus (POM) method at 23° C. Two parts of an optical fiber were fixed with two chuck devices, a coating resin layer (the primary resin layer and the secondary resin layer) between the two chuck devices was removed, and then one chuck device was fixed and another chuck device was slowly moved in the opposite direction of the fixed device. When the length of the portion sandwiched between the chuck devices to be moved in the optical fiber is L, the amount of movement of the chuck is Z, the outer diameter of the primary resin layer is Dp, the outer diameter of the glass fiber is Df, the Poisson's ratio of the primary resin layer is n, and the load in moving the chuck device is W, the Young's modulus of the primary resin layer was determined from the following formula.

Young's modulus (MPa)=$((1+n)W/\pi LZ) \times \ln(Dp/Df)$ (Young's Modulus of the Secondary Resin Layer)

The Young's modulus of the secondary resin layer was determined from 2.5% secant value by using a pipe-shaped coating resin layer (length: 50 mm or more) obtained by taking out a glass fiber from an optical fiber to perform a tensile test (distance between marked lines: 25 mm) in an environment of 23±2° C. and 50±10% RH.

(Si Amount of Coating Resin Layer)

The amount of silicon atoms (Si) contained in the coating resin layer was calculated with ICP-AES according to the following procedure. The alkaline melting method was used as a pretreatment method for the quantitative analysis of Si.

About 0.1 to 0.2 g of the coating resin layer was heat-treated at 800° C. for 60 minutes to incinerate. 3 g of sodium carbonate and 0.5 g of boric acid were added to 0.1 g of ash and alkaline melting was performed at 1000° C. for 30 minutes, and then 10 mL of concentrated hydrochloric acid was added, and ultrapure water was further added to obtain a sample solution having a constant volume of 100 mL The sample solution was diluted 10-fold with ultrapure water, and the amount of Si was measured at a wavelength of 212.412 nm by using Thermo Fisher SCIENTIFIC (model: iCAP 6500 Duo).

(Heat Cycle Test)

For optical fibers that have been heated for 50 cycles between −40° C. and 23° C. (holding for 1 hour at each temperature and transition time was 60 minutes), the transmission characteristics of signal light having a wavelength of 1550 nm were measured under each temperature condition of 23° C. and −40° C. to determine the transmission loss at 23° C. and −40° C. The case where the transmission loss difference obtained by subtracting the transmission loss at 23° C. from the transmission loss at −40° C. was less than 0 dB/km (transmission loss at −40° C. was smaller) was evaluated as "A", the case of 0 dB/km or more and less than 0.01 dB/km was evaluated as "B", and the case of 0.01 dB/km or more was evaluated as "C".

(Lateral Pressure Characteristics)

The transmission loss of light having a wavelength of 1550 nm when the optical fiber was wound into a single layer onto a bobbin with its surface covered with sandpaper and having a diameter of 280 mm was measured by an OTDR (Optical Time Domain Reflectometer) method. In addition, the transmission loss of light having a wavelength of 1550 nm when the optical fiber was wound into a single layer on a bobbin having a diameter of 280 mm without sandpaper was measured by the OTDR method. Difference in the measured transmission loss was obtained and the lateral pressure characteristics was evaluated as "A" when the transmission loss difference was 0.6 dB/km or less, and the lateral pressure characteristics was evaluated as "B" when the transmission loss difference was over 0.6 dB/km.

TABLE 1

| Example | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Primary resin layer | | | | | | | | | | | | | | |
| Oligomer | a2 | a2 | a2 | a2 | a1 | a3 | a1 | a3 | a2 | a2 | a2 | a2 | a1 | a1 |
| Silica particles (& by mass) | 15 | 15 | 15 | 15 | 15 | 15 | 15 | 15 | 5 | 10 | 20 | 20 | 5 | 30 |

TABLE 1-continued

| Example | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Young's modulus (MPa) Secondary resin layer | 0.2 | 0.2 | 0.2 | 0.2 | 0.05 | 0.6 | 0.05 | 0.6 | 0.2 | 0.2 | 0.2 | 0.2 | 0.05 | 0.05 |
| Silica particles (% by mass) | 20 | 30 | 40 | 60 | 30 | 30 | 60 | 60 | 30 | 30 | 30 | 60 | 10 | 60 |
| Young's modulus (MPa) | 1600 | 1800 | 2100 | 2700 | 1800 | 1800 | 2700 | 2700 | 1800 | 1800 | 1800 | 2700 | 1400 | 2700 |
| Si amount (% by mass) | 8.3 | 10.9 | 13.4 | 18.6 | 10.9 | 10.9 | 18.6 | 18.6 | 8.8 | 9.8 | 11.9 | 19.6 | 3.6 | 21.7 |
| Heat cycle test | A | A | A | A | A | A | A | A | A | A | A | A | A | A |
| Lateral pressure resistance characteristics | A | A | A | A | A | A | A | A | A | A | A | A | A | A |

TABLE 2

|  | Comparative Example | | | |
|---|---|---|---|---|
|  | 1 | 2 | 3 | 4 |
| Primary resin layer | | | | |
| Oligomer | a2 | a2 | a2 | a2 |
| Silica particles (% by mass) | — | 50 | — | — |
| Young's modulus (MPa) | 0.2 | 0.8 | 0.2 | 0.2 |
| Secondary resin layer | | | | |
| Silica particles (% by mass) | 20 | — | 65 | — |
| Young's modulus (MPa) | 1800 | 1600 | 2800 | 1100 |
| Si amount (% by mass) | 5.1 | 12.8 | 16.7 | <0.05* |
| Heat cycle test | C | A | C | A |
| Lateral pressure resistance characteristics | A | B | B | B |

*Detection limit or less

REFERENCE SIGNS LIST

10: Optical fiber, 11: Core, 12: Cladding, 13: Glass fiber, 14: Primary resin layer, 15: Secondary resin layer, 16: Coating resin layer.

The invention claimed is:

1. An optical fiber comprising:
a glass fiber comprising a core and a cladding; and
a coating resin layer,
wherein the coating resin layer has a primary resin layer being in contact with the glass fiber and coating the glass fiber and a secondary resin layer coating the primary resin layer,
the primary resin layer and the secondary resin layer are resin layers containing inorganic oxide particles, and
wherein a Young's modulus of the primary resin layer is 0.03 MPa or more and 0.7 MPa or less at 23° C.

2. The optical fiber according to claim 1, wherein the inorganic oxide particles are at least one selected from the group consisting of silicon dioxide, zirconium dioxide, aluminum oxide, magnesium oxide, titanium oxide, tin oxide, and zinc oxide.

3. The optical fiber according to claim 2, wherein the inorganic oxide particles are silicon dioxide, and an amount of silicon atoms contained in the coating resin layer is 3% by mass or more and 22% by mass or less.

4. The optical fiber according to claim 1, wherein a Young's modulus of the secondary resin layer is 1300 MPa or more and 2750 MPa or less at 23° C.

5. The optical fiber according to claim 2, wherein a Young's modulus of the secondary resin layer is 1300 MPa or more and 2750 MPa or less at 23° C.

6. The optical fiber according to claim 3, wherein a Young's modulus of the secondary resin layer is 1300 MPa or more and 2750 MPa or less at 23° C.

* * * * *